Nov. 9, 1937.　　　C. N. BATSEL　　　2,098,699
COMBINED SOUND AND PICTURE APPARATUS
Filed April 30, 1935
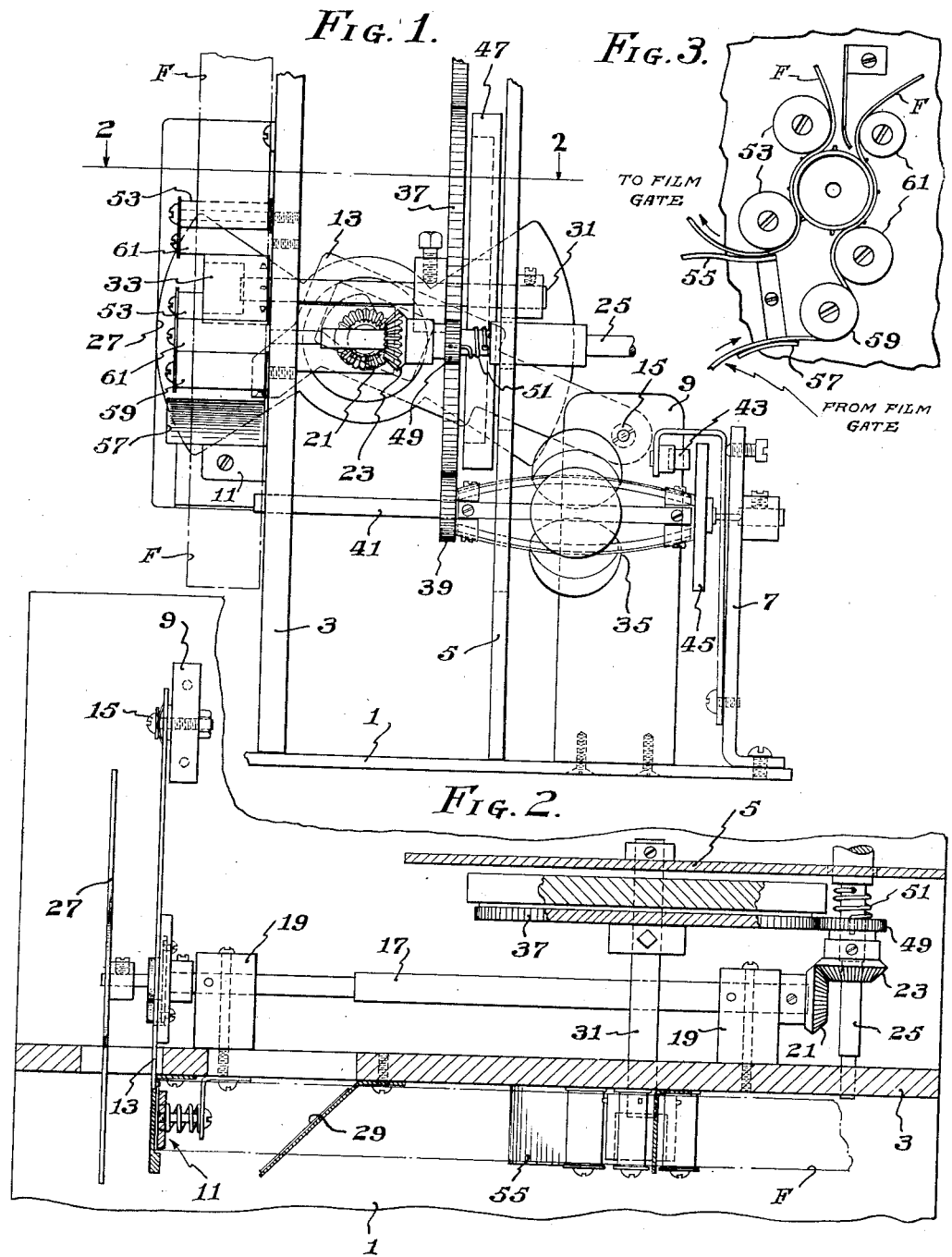
INVENTOR
Cecil N. Batsel
ATTORNEY Patented Nov. 9, 1937

2,098,699

UNITED STATES PATENT OFFICE 2,098,699

COMBINED SOUND AND PICTURE APPARATUS

Cecil N. Batsel, Haddonfield, N. J., assignor to Radio Corporation of America, a corporation of Delaware Application April 30, 1935, Serial No. 19,034

5 Claims. (Cl. 88—16.2)

This invention relates to combined sound and picture apparatus, and more particularly to the means in such apparatus for advancing the film therethrough.

In combined sound and picture projecting apparatus most commonly used at present, it is customary to advance a film bearing both the pictures and the sound record past two reproducing stations at one of which the pictures are projected and at the other of which the sound is translated. At the picture projecting station, the film is advanced intermittently in order to produce the illusion of motion, but at the sound reproducing station, the film must be advanced at a uniform speed, since even slight variations in the speed of the film at this station may result in obnoxious variations in pitch of the reproduced sound.

Many proposals have been made in the prior art to isolate that portion of the film from which sound is being reproduced at any instant from that portion from which pictures are being simultaneously projected. For example, it has been proposed to displace the picture reproducing station and the sound reproducing station a substantial distance longitudinally of the film in its path of travel and to form one or more loops in that portion of the film which lies between these two stations, the film being maintained under tension at the sound reproducing station and being advanced at as nearly uniform speed as possible at this station, and the loop or loops, as the case may be, taking care of any variations in the instantaneous length of film between the two stations as a result of the intermittent advance thereof at the picture projecting station. However, since the film advancing mechanisms at both stations are usually driven from a single prime mover and through devices at least partly in common to both drives, it has been found that variations in the movement of some of the parts, such as the intermittent driving mechanism at the picture projecting station, are more or less transmitted back through the driving mechanism to the film advancing means at the sound reproducing station. This results in slight variations of the film advancing means at the latter station, particularly in apparatus designed for amateur and semi-professional use, and the purpose of providing the aforesaid loops is thus more or less defeated.

The primary object of my invention is to provide, in combined sound and picture apparatus of the type described, whether a recorder or a reproducer, driving mechanism for the film which will not be subject to the defects and disadvantages of prior art devices.

Otherwise stated, it is an object of my invention to isolate as nearly as possible, in combined sound and picture apparatus, the sound station from the picture station so that mechanical disturbances or variations produced at the latter station will not be transmitted to the former one.

More specifically, it is an object of my invention to provide improved sound picture apparatus of the type aforesaid wherein any variations in the movement of the intermittent mechanism at the picture station will not be transmitted to the film advancing means at the sound translating station.

Another object of my invention is to provide improved sound picture apparatus including a film driving sprocket at the sound translating station with means for controlling the speed of the sprocket and for filtering out the intermittent disturbances to such an extent that satisfactory sound may be reproduced from a film run therethrough.

A further object of my invention is to provide improved sound picture apparatus of the type set forth which will be simple in construction and highly efficient in use.

In accordance with my invention, the film driving mechanism comprises any suitable intermittent feed mechanism at the picture projecting station and a sprocket or equivalent film advancing device at the sound translating station, both being motivated from a single motor. The sprocket is geared directly to a fly ball governor which is friction controlled, and, preferably, together with the governor, is driven through a pinion gear which is resiliently coupled to the motor, as by a spring. The teeth of the pinion gear exert a constant pressure against the teeth of the sprocket gear in the driving direction, and the overall speed of the device is controlled by the governor which, being friction controlled, will not oscillate.

The novel features that I consider characteristic of my invention are set forth with particularity in the appended claims. The invention itself, however, both as to its organization and method of operation, together with additional objects and advantages thereof, will best be understood from the following description of a specific embodiment, when read in connection with the accompanying drawing, in which Figure 1 is a rear elevation, with the casing removed, of a sound-picture projector constructed in accordance with my invention, Fig. 2 is a sectional view taken on the line 2—2 of Fig. 1, and Fig. 3 is a detail elevation of the station at which the sound is translated.

Referring more specifically to the drawing, wherein like reference characters designate corresponding parts throughout, there is shown a base plate 1 on which are mounted a pair of spaced, parallel partitions 3 and 5 and a pair of standards 7 and 9. The partition 3 has mounted thereon a film gate 11 constituting a picture projecting station through which the film is intermittently advanced in well known manner by means of an intermittent 13 of any suitable type pivotally mounted on the standard 9, as at 15, for vertical movement. The intermittent mechanism 13 may be of the type shown, for example, in U. S. Patent No. 1,923,855, being actuated from a shaft 17 rotatably supported in bearing blocks 19 and having a bevel gear 21 thereon which receives power from a bevel gear 23 fixed to a driving shaft 25 of a suitable motor (not shown). A shutter 27 is also actuated from the shaft 17 in timed relation with the intermittent 13 to permit projection of the pictures in a manner well known to those skilled in the art, light for this purpose being received from a suitable light source (not shown) and directed through the film gate 11 by a reflector 29.

Mounted for rotation in the partitions 3 and 5 is a shaft 31 to which is fixed a sprocket 33, the sprocket constituting the sound translating station and serving also to draw a film F from a magazine (not shown), advance it through the projector, and feed it back into the magazine. A suitable optical system (not shown) is employed to focus a fine beam of light from any suitable source onto the film at the sprocket 33, the light being modulated in accordance with the sound record on the film and passing to a photo-electric device (not shown) for the reproduction of the sound in well known manner.

The sprocket 33 is geared directly to a fly-ball or other suitable governor 35 through a gear 37 which is fixed to the shaft 31 and which meshes with a gear 39 on the governor shaft 41, an adjustable brake pad 43 mounted on the standard 7 in cooperative relation to the governor disc 45 serving to control the speed of the governor and thus the speed of the sprocket 33. A flywheel 47 is also preferably fixed to the shaft 31 for insuring uniform speed of the sprocket 33, while a gear 49 which is coupled to the driving shaft 25 by means of a coil spring 51 one end of which is fixed to the gear 49 and the other end to the shaft 25 serves to transmit power from the shaft 25 to the gear 37 and the sprocket 33.

To thread the film F, it is brought into engagement with the sprocket 33 under a pair of guide rollers 53 and thence is led over a guide plate 55 to the film gate 11, a loop being left in the film between the guide plate 55 and the gate 11. From the film gate 11, the film is passed over a second guide plate 57, leaving another loop between the gate 11 and the guide plate 57, and around a guide roller 59, being then again brought into engagement with the sprocket 33 under a pair of rollers 61, and from there it is led to the take-up reel. The edge of the film bearing the sound track is permitted to hang over the edge of the sprocket 33, as clearly shown in Figures 1 and 2, and sound is taken off therefrom between the two rollers 61.

Since the sound is taken off from the film at the sprocket or sound station 33, it is imperative that the sprocket always rotate at uniform speed during reproduction. Were it not for the resilient coupling 51 between the gear 49 and the driving shaft 25, mechanical disturbances produced by the intermittent 13 would be transmitted through the shaft 17, gears 21 and 23, shaft 25, gear 49, gear 37 and shaft 31 to the sprocket 33. The coil spring 51, however, which is so arranged as to cause the teeth of the gear 49 to exert a constant pressure against the teeth of the gear 37 in the driving direction, prevents such disturbances from reaching the sprocket 33, and therefore the speed of the sprocket will be uniform and constant under the influence of the fly wheel 47 and the governor 35.

Although I have shown and described but a single embodiment of my invention, I am fully aware that many modifications thereof are possible. For example, instead of coupling the gear 49 resiliently to the driving shaft 25, it may be fixed to that shaft, and the gear 37 may be resiliently coupled to its shaft 31. Also, if desired, the gear 23 may be resiliently coupled to the shaft 25 instead of the gear 49, or the gears 23 and 49 may both be fixed to the shaft 25 and the intermittent operating cam on the shaft 17 may be resiliently coupled to the shaft 17 to accomplish the purpose of my invention. Moreover, while I have described my invention specifically with reference to a sound-picture projector, it will be readily apparent to those skilled in the art that it is equally applicable to a recorder or a camera for simultaneously taking pictures and recording sound. My invention is therefore not to be limited except insofar as is necessitated by the prior art and by the spirit of the appended claims.

I claim as my invention:

1. In sound-picture apparatus, the combination of a motor, a driving shaft associated with said motor, a picture station, means for advancing a film intermittently at said picture station, a sound station, means for advancing the film uniformly at said sound station, said last named means comprising a second shaft having film engaging means thereon and a gear fixed to said shaft, means coupling said driving shaft to said intermittent means, said coupling means including a second gear fixed to said driving shaft, and means coupling said driving shaft to said second named means, said last named coupling means including a third gear and means resiliently coupling said third gear to said driving shaft, said first named gear meshing with said third gear, and said resilient coupling means comprising a coil spring having one end thereof fixed to said driving shaft and the other end thereof fixed to said third gear, said coil spring being so arranged as to cause the teeth of said third gear to exert constant pressure against the teeth of said first named gear in the driving direction.

2. The invention set forth in claim 1 characterized by the addition of a friction controlled governor coupled to said first named gear for controlling the speed of said sound station film advancing means.

3. In phonographic apparatus, the combination of a motor, a driving shaft associated with said motor, means for advancing a perforated film record uniformly past the sound translating station comprising a shaft and a sprocket mounted thereon for engaging said film, a gear on said sprocket shaft, a second gear resiliently coupled to said driving shaft and meshing with said first named gear, and a friction controlled governor coupled to said sprocket shaft gear for controlling the speed of said sprocket.

4. The invention set forth in claim 3 characterized in that the resilient coupling between said second gear and said drive shaft is constituted by a coil spring fixed at one end to said shaft and at the other end to said gear, and characterized in that said spring is so arranged as to cause the teeth of said second gear to exert a constant pressure against the teeth of said sprocket shaft gear in the driving direction.

5. The invention set forth in claim 3 characterized by the addition of a fly wheel on said sprocket shaft.

CECIL N. BATSEL.